United States Patent [19]
Koide

[11] Patent Number: 5,258,998
[45] Date of Patent: Nov. 2, 1993

[54] DATA COMMUNICATION APPARATUS PERMITTING CONFIDENTIAL COMMUNICATION

[75] Inventor: Yumi Koide, Tokyo, Japan

[73] Assignee: Canon Kabushiki Kaisha, Tokyo, Japan

[21] Appl. No.: 701,335

[22] Filed: May 10, 1991

Related U.S. Application Data

[63] Continuation of Ser. No. 267,732, Nov. 3, 1988, abandoned, which is a continuation of Ser. No. 913,997, Oct. 1, 1986, abandoned.

[30] Foreign Application Priority Data

Oct. 7, 1985 [JP] Japan .................................. 60-222928

[51] Int. Cl.$^5$ ............................................. H04N 1/44
[52] U.S. Cl. ........................................ 375/7; 358/433; 358/434; 380/18; 380/20; 340/825.34
[58] Field of Search .................. 358/75, 141, 142, 335, 358/343, 349, 400, 401, 402, 403, 434, 435, 436, 438, 440, 442, 443, 462, 467, 468, 470, 433, 453; 380/3-5, 10, 18, 20, 37, 42, 23, 24, 25; 340/825.34; 360/19.1; 379/95, 100; 325/2; 355/201; 283/902

[56] References Cited

U.S. PATENT DOCUMENTS

| | | | |
|---|---|---|---|
| 3,594,495 | 7/1971 | Bond | 380/18 |
| 3,678,180 | 7/1972 | Bond | 358/440 |
| 3,757,225 | 9/1973 | Ulicki | 358/142 |
| 4,091,423 | 5/1978 | Branscome | 380/18 |
| 4,151,562 | 4/1979 | Tregay | 358/433 |
| 4,205,343 | 5/1980 | Barrett | 380/18 |
| 4,317,136 | 2/1982 | Keyt et al. | 358/425 |
| 4,543,616 | 9/1985 | Brooks | 360/19.1 |
| 4,550,341 | 10/1985 | Naito | 380/20 |
| 4,553,172 | 11/1985 | Yamada et al. | 358/462 |
| 4,558,464 | 12/1985 | O'Brien, Jr. | 380/20 |
| 4,566,039 | 1/1986 | Oya | 358/462 |
| 4,566,127 | 1/1986 | Sekiya et al. | 358/462 |
| 4,580,161 | 4/1986 | Petrus et al. | 380/20 |
| 4,581,656 | 4/1986 | Wada | 358/438 |
| 4,600,921 | 7/1986 | Thomas | 380/18 |
| 4,628,366 | 12/1986 | Yamada | 358/280 |
| 4,658,292 | 4/1987 | Okamoto et al. | 380/20 |
| 4,685,131 | 8/1987 | Horne | 380/20 |
| 4,908,873 | 3/1990 | Philibert et al. | 340/825.34 |

FOREIGN PATENT DOCUMENTS

| | | | |
|---|---|---|---|
| 0198968 | 10/1985 | Japan | 380/18 |
| 2089619 | 6/1982 | United Kingdom | 358/440 |

OTHER PUBLICATIONS

Steinbuck, K. and Rupprecht, W., "Nachrichtentechnik" 3. Aufl. vol. II, Springer-Verl. 1982, pp. 156–159.

Primary Examiner—Douglas W. Olms
Assistant Examiner—Alpus H. Hsu
Attorney, Agent, or Firm—Fitzpatrick, Cella, Harper & Scinto

[57] ABSTRACT

A data communication apparatus, such as a facsimile machine, in which the data of a page is transmitted in plural blocks, and the sending unit designates the blocks to be released as output. In this manner particular data can be sent to a particular receiving unit as secret information.

15 Claims, 5 Drawing Sheets

DATA COMMUNICATION APPARATUS PERMITTING CONFIDENTIAL COMMUNICATION

This application is a continuation of application Ser. No. 07/267,732 filed Nov. 3, 1988, now abandoned, which is a continuation of application Ser. No. 913,997 filed Oct. 1, 1986, now abandoned.

BACKGROUND OF THE INVENTION

1. Field of the Invention

The present invention relates to a data communication apparatus.

2. Related Background Art

Some conventional data communication apparatus, for example facsimile apparatus, are equipped with a private communication function for transmitting messages only to a limited group of persons. However, in the use of such a function, the entire document to be transmitted is treated as confidential or private. Therefore, even in a case where only a portion of a page of the document has to be distributed as confidential to limited recepients, the entire page has to be treated as confidential. Consequently, in such a case, the remaining portions of the page cannot be received in the usual manner as facsimile transmission.

SUMMARY OF THE INVENTION

An object of the present invention is to provide an improvement on data communication apparatus.

Another object of the present invention is to eliminate the above-explained drawbacks of the prior technology.

Still another object of the present invention is to provide a data communication apparatus capable of prohibiting visualization of a specified portion of the transmitted data.

Still another object of the present invention is to provide a data communication apparatus capable of transmitting data in divided blocks and prohibiting visualization of a specified block or blocks.

Still other objects, features and advantages of the present invention will become fully apparent from the description of embodiments in the following.

DETAILED DESCRIPTION OF THE PREFERRED EMBODIMENTS

Now the present invention will be clarified in detail by description of the preferred embodiment thereof, shown in the attached drawings.

Figure 1:
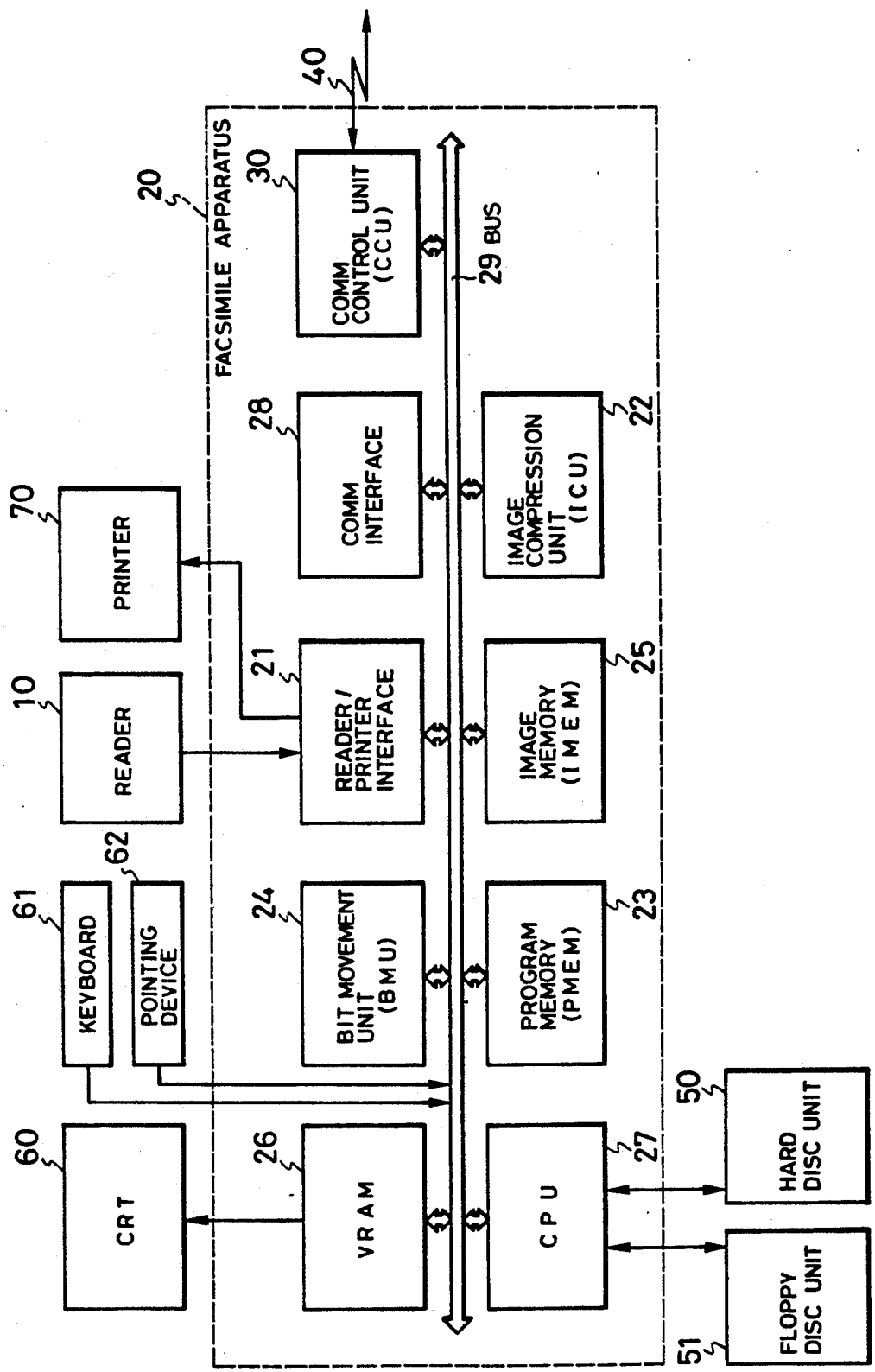
FIG. 1 is a block diagram of an embodiment of the present invention.
Figure 2:
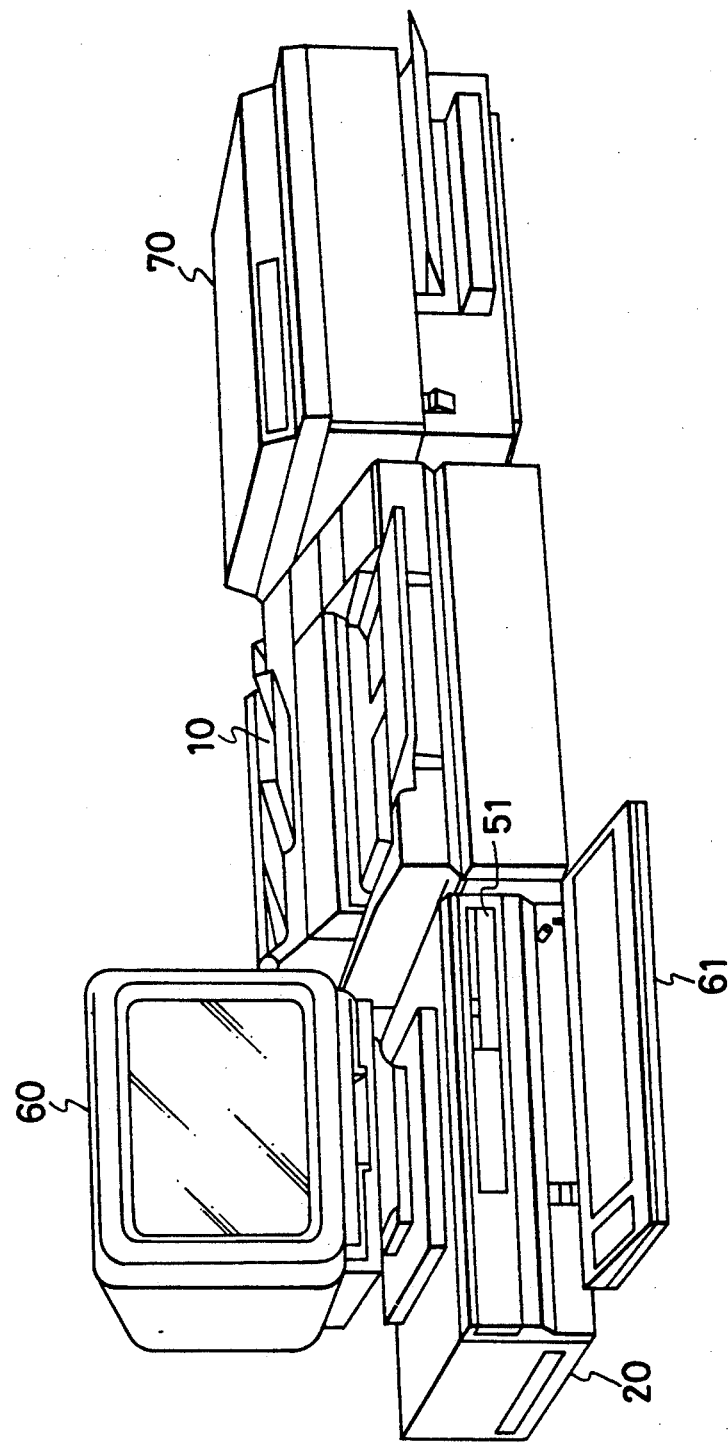
FIG. 2 is a perspective view of said embodiment.

FIG. 1 is a block diagram of an embodiment of the present invention, and FIG. 2 is a perspective view thereof.

A reader 10 is provided to generate an electrical signal by reading an original document.

A facsimile apparatus 20 is provided with a reader/printer interface 21; an image compression unit (ICU) 22; a program memory (PMEM) 23; a bit move unit (BMU) 24; an image memory IMEM 25; a video random access memory (VRAM) 26; a central processing unit (CPU) 27; a communication interface 28; a bus 29; and a communication control unit (CCU) 30.

The image compression unit (ICU) 22 is provided for compressing or expanding data, and employs two-dimensional compression (high compression) for achieving a high coding efficiency. The program memory (PMEM) 23 has memory areas for operation system programs and application programs for controlling the various units of the facsimile apparatus 20 and the peripheral input/output devices, and a font memory area for converting character codes into image data.

Also the PMEM 23 is provided with a memory management unit (MMEU) and work areas functioning as a buffer memory for the data to be transmitted from a hard or rigid disk through the communication control unit (CCU) 30 or to be stored in the rigid disk from the CCU 30. Said buffer memory is used for speed matching among the rigid disk, the transmission channel and so on.

The bit move unit (BMU) 24 is used for image processing or editing on a cathode ray tube display 60, and is capable of enlarging, reducing, rotating, displacing or trimming an image.

The image memory (IMEM) 25 has a capacity of 4 bytes and is used for storing image data from the reader, image data edited in the bit move unit 24, data expanded in the image compression unit(ICU) 22, word processed character code data, mixed data, and image data converted from character codes. In the case of mixed data, each image or character block is stored with an identification code. Also, the IMEM 25 is used for matching the speeds among the reader 10, the channel 40, etc., by temporarily storing necessary data. The VRAM stores image data to be displayed on the cathode ray tube 60 in the form of bit map codes.

As external memories there are provided a rigid disk device 50 and a floppy disk device 51. These are nonvolatile memories but may be replaced by backup memories.

A keyboard 61 is used for entering characters or the like and for designating a position of the cathode ray tube display 60 by means of a cursor. There are also provided a pointing device 62 and a printer 70.

In the following there will be explained the function of the above-explained embodiment.

Figure 3:
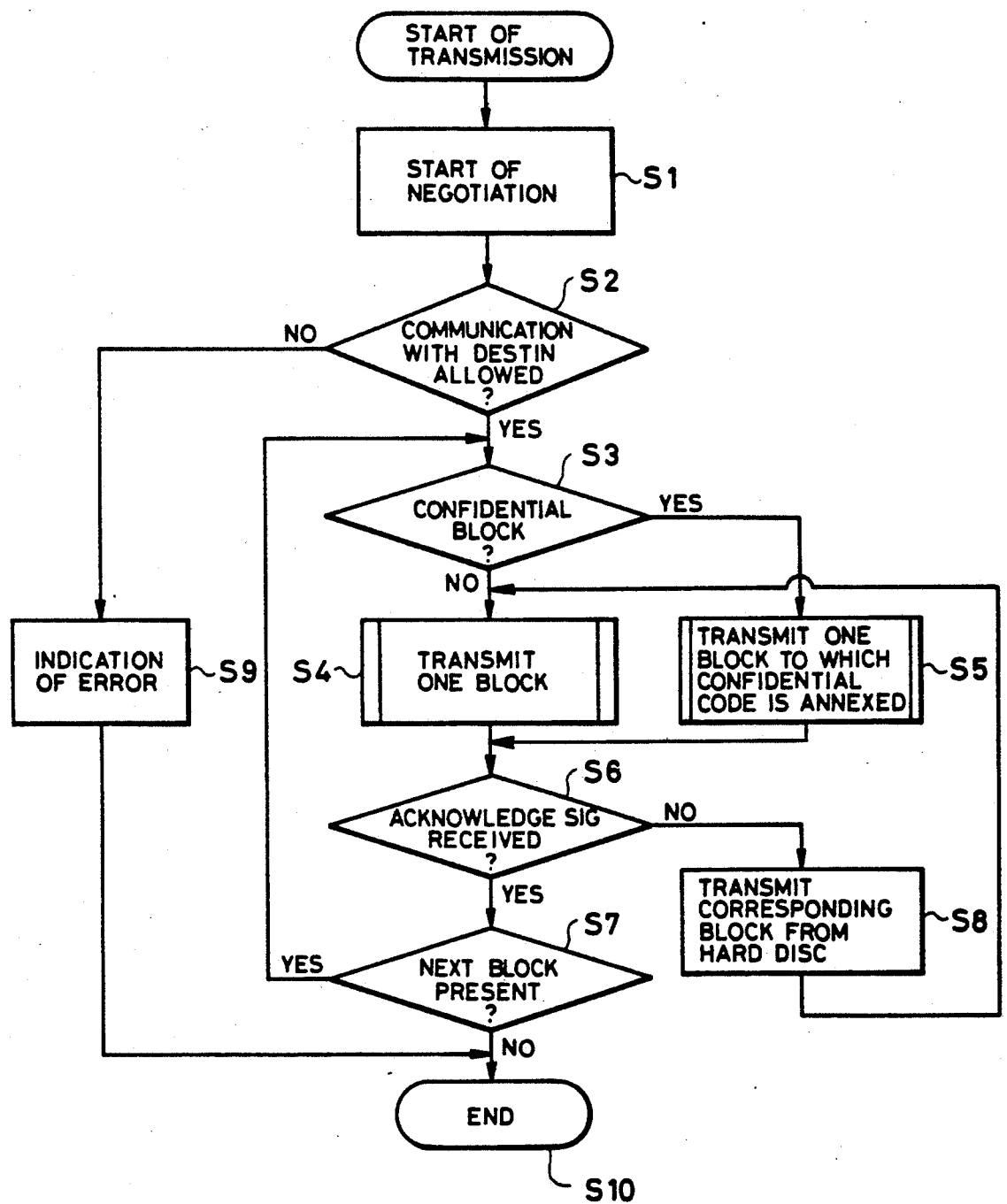
FIG. 3 is a flow chart showing a transmitting operation in said embodiment.

FIG. 3 is a flow chart of a transmitting procedure in said embodiment, to be executed by the CPU 27 according to a program stored in the PMEM 23.

At first a negotiation is conducted (S1) with another station to discriminate whether communication is enabled (S2). If communication is not possible due to trouble in the communication channel or due to a difference in the communication mode, an error display is made (S9) and the transmission procedure is terminated (S10).

If the communication is possible in the above-mentioned step S2, there is discriminated whether one block in the data to be transmitted is a confidential block (S3).

If the block is confidential, it is transmitted from the rigid disk through the memory 23 (S4) with a confidential code (S5). If the block is not confidential, it is transmitted without the code. Then the reception of an acknowledgment signal from the destination station is discriminated (S6).

Prior to the step S1, the binarized image data from the reader 10, or the character data or mixed data from the cathode ray tube are stored in the rigid disk.

Upon reception of said acknowledgment signal, there is identified whether there are still remaining blocks to be transmitted (S7). If blocks are still remaining, the program returns to the step S3 to repeat the above-explained procedure until all the blocks are transmitted, whereupon the procedure is terminated (S6).

If an acknowledgement signal is not received from the destination station after the transmission of a block in the steps S4 and S5, the data of said block relating to the acknowledgement signal not received is sent from the rigid disk (S8). That is, the data of said block is again sent. The reliability of the transmitted data is thus improved.

In the flow chart shown in FIG. 3, the reception of an acknowledgement signal is confirmed for each block, but such confirmation may be made for each window size or for each page of the original.

In the following there will be more detailedly explained the data transmission.

At first the original document is read by the reader 10, and the corresponding image data are kept in the IMEM 25 through the reader/printer interface 21 and stored in the rigid disk 50. The data thus stored in the rigid disk 50 are stored in the PMEM 23 and then transmitted to the destination station through the communication control unit 30 and the communication channel 40.

In the case of editing data stored in the rigid disk 50, said data are written in the IMEM 25 and subjected to image expansion, displacement, etc., by the bit move unit 24. For mixing characters in this editing operation, character data converted from characters entered from the keyboard 61 or character data already stored in the rigid disk 50 can be put into a character block of the image edited by the bit move unit 24.

In such mixed editing procedure, there is identified whether plural blocks in the mixed information are image blocks or character blocks, and an identification code is attached to each block. If any image block or character block is a confidential block, a corresponding input is made through the keyboard 61 to attach a confidential identification code to a corresponding block in the rigid disk 50.

After said editing, the block is temporarily stored in the rigid disk, then transferred to the PMEM 23 and transmitted through the CCU 30 and the channel 40.

In the case that the transmitted block is a confidential block in the above-explained procedure, a confidential code is attached to the header (identification signal) of said block prior to the transmission. Then, the block is transferred to the PMEM 23 and transmitted through the CCU 30 and the channel.

For printing the edited data, the edited data are transferred to the image memory 25, and sent to the printer 70 through the reader/printer interafce 21. Also, data after or in the course of editing can be displayed on the cathode ray tube 60, by storing and reading said data in and from the VRAM 26.

Figure 4:
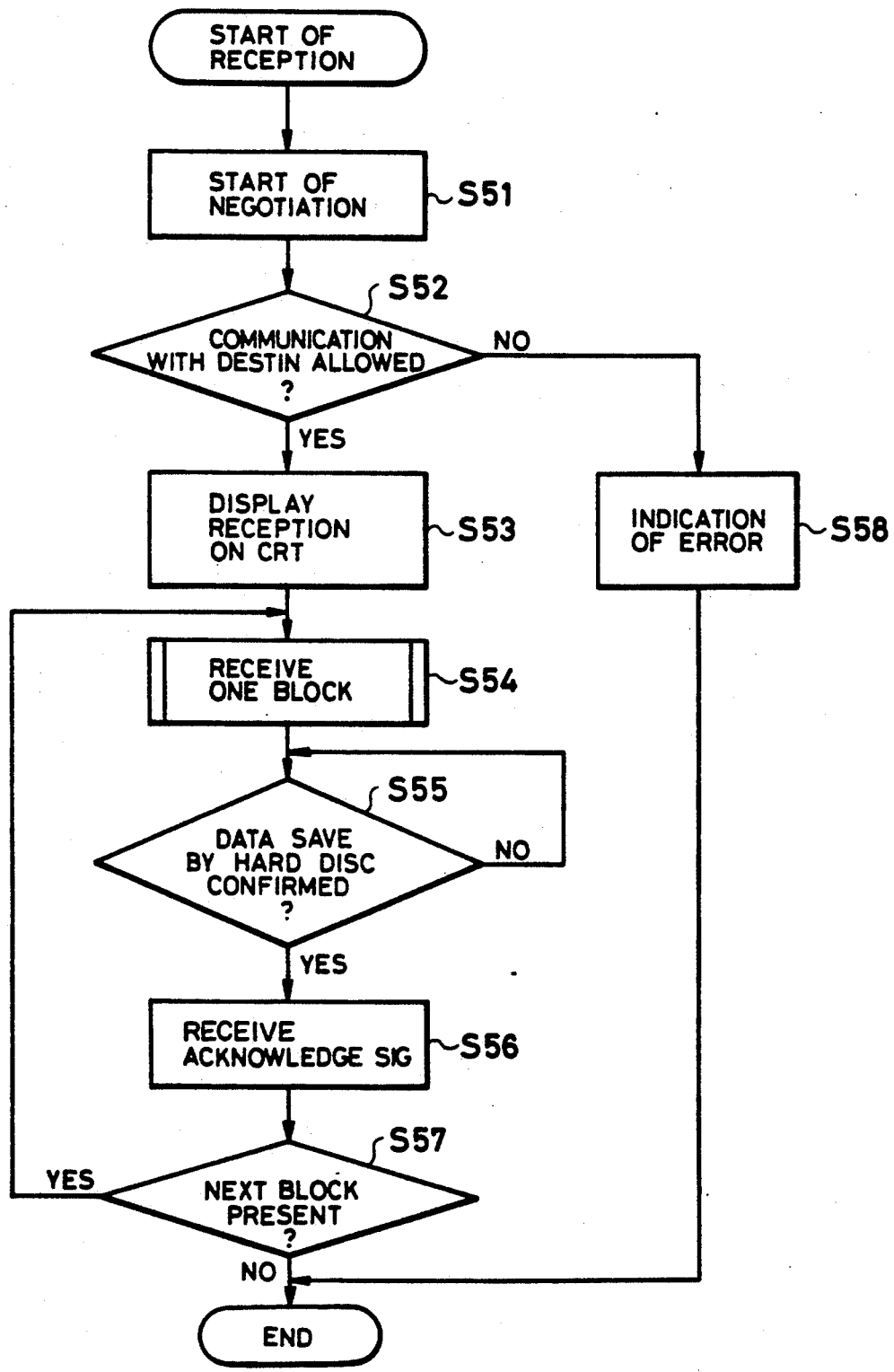
FIG. 4 is a flow chart showing a receiving operation in said embodiment.

FIG. 4 is a flow chart showing a receiving operation in the present embodiment.

At first a negotiation is started with another station (S51) to discriminate whether communication is enabled (S51). If communication is possible, content of reception, the number of the other station, and its class are displayed on the cathode ray tube 60 (S53). Such display is made when the other station is designated.

Said display appears also in the course of an editing operation, in flashing manner, in the lower portion of the frame of the cathode ray tube 60 in order not to inferfere with the editing operation. A call signal can be received in the course of mixed editing of a character image and a reader.image by means of the BMU 24, IMEM 25, cathode ray tube 60, keyboard 61 and pointing device or mourse 62. Mixed data received through the channel 40 and the CCU 30 are stored in the rigid disk 50 through the PMEM 23 by means of an interruption and multi-task function without interrupting said mixed editing operation.

The data of one block are received and stored in the rigid disk 50 (S54). Upon confirmation of storage of the data of said block (S55), an acknowledgment signal representing the reception of data of one block, is transmitted to the other station (S56). Then there is identified whether other blocks are still remaining (S57). If it is YES, the procedure of reception, storage in the rigid disk 50 and the transmission of acknowledgement signal are repeated. On the other hand, if communication is not possible, there is displayed an error message (S58).

The reliability of the received data is improved since the acknowledgement signal is transmitted after the received data are stored in the rigid disk 50 block by block. Also, instead of acknowledgement for each block, there can be made acknowledgement for each window size or for each page of the original.

In actual receiving procedure, the data received through the channel 40, CCU 30 and communication interface 28 are memorized in the PMEM 23 and then stored in the rigid disk 50.

When a confidential code is represented in the header of said block on the reception of a confidential block , it is memorized in the rigid disk device 50 that said block is confidential.

The rigid disk 50 has a high reliability on the storage of the received data, since it cannot be removed by the user and retains the data even when the power supply is turned off.

Figure 5:
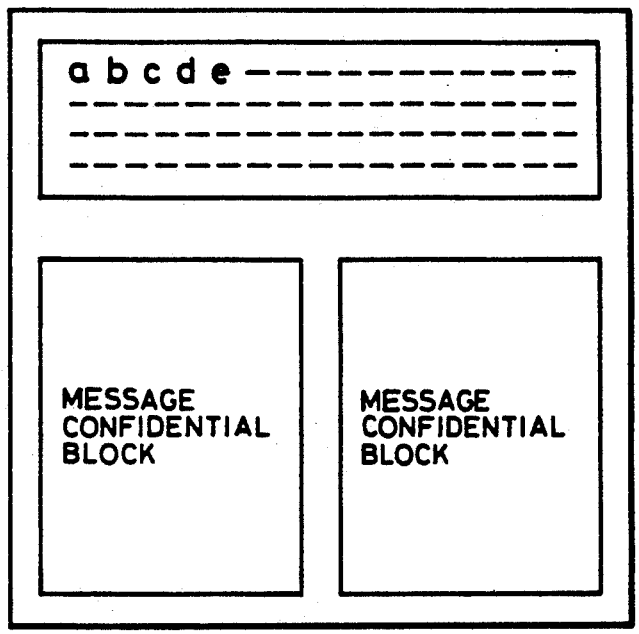
FIG. 5 is a view showing an example of an alternative message for a confidential block in mixed mode information.

In case of printing the received mixed data, there is checked the presence of a confidential code in the header of each block. If the code is present, confidential blocks are made blank while non-confidential blocks remain as they are, and both types of blocks are transferred to the IMEM 25, and supplied to the printer 70 through the reader/printer interface 21. FIG. 5 shows an example of printout.

Confidential blocks can be printed out by the entry of a password by designated recipients.

Figure 6:
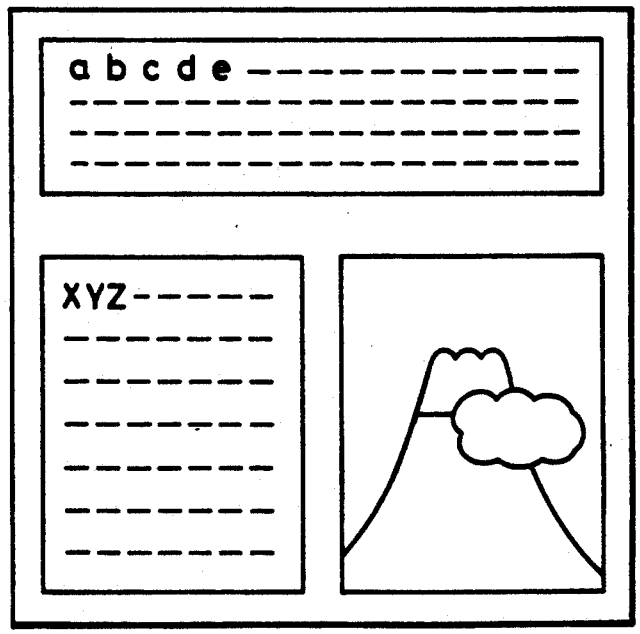
FIG. 6 is a view showing an example in which the confidential block in FIG. 5 is displayed in normal manner.

Also in case of display on the cathode ray tube 60, there is discriminated whether the identification signal of each block contains a confidential code, and, if confidential, the corresponding block is made blank. Instead, an alternative message indicating that said block is a confidential block, is supplied to the VRAM 26 and transferred to the cathode ray tube 60. Thus, such a display as shown in FIG. 5 is obtained. The confidential block can be displayed by the entry of a password by designated recipients, as shown in FIG. 6.

In addition to the confidential code indicating a confidential block, there may be added the information of the destination of the confidential message in the form of code data. Based on the code data, the receiving side may display, for example, the name of the destination on the cathode ray tube 60, in addition to the confidential block message shown in FIG. 6. In such case display data of said name corresponding to said code data are stored in advance in the rigid disk 50 or floppy disk 51, and at the display of the received block on the cathode ray tube 60, said display data are read from the rigid disk 50 or floppy disk 51 in response to said code data, stored in the VRAM 26 and displayed on the cathode ray tube 60.

As an application of the present embodiment, in the case of transmitting original data of a page as confidential, it is possible to write the name of the receiver of the confidential message on the original document, and to transmit said data in a confidential block and an output block, thereby displaying the block for said confidential receiver on the cathode ray tube 60 of said receiver, thus clarifying the destination of said confidential data.

Naturally the present embodiment is not limited to the above-explained mode of use but can also be applied to various other modes of use.

Though the foregoing embodiment employs a mixed mode terminal, the present invention is applicable to any data communication apparatus such as facsimile or telex units.

As explained in the foregoing, the present invention allows one to prohibit visualization of arbitrarily specified portions of the transmitted data, thereby enabling one to use the data communication apparatus in varied manners and to protect the secrecy of transmitted data.

It will be understood that the present invention is not limited to the foregoing embodiment but is subject to various modifications and variations.

I claim:

1. A data transmitting apparatus comprising:
   data transmission means for dividing at least one page of data into blocks in accordance with the kinds of data and transmitting the blocks of data to a receiving apparatus; and
   means for generating and setting a confidential code in one or more of the blocks of data,
   wherein each block of data includes identification data indicating its kind and wherein said generating and setting means set the confidential code for inhibiting reproduction, at the receiving apparatus, of the one or more blocks of data having the confidential code such that, in response to a request for reproduction, only blocks of data having no such confidential code are reproduced at the receiving apparatus, and blocks of data having the confidential code are reproduced only in response to a further code corresponding to the confidential code.

2. An apparatus according to claim 1, wherein said data transmission means divides at least one page of data comprising character code data and image data into respective blocks.

3. An apparatus according to claim 2, wherein each of the blocks is provided with an identification code indicating whether the block consists of character code data or of image data.

4. A data receiving apparatus comprising:
   data receiving means for receiving at least one page of data transmitted in divided blocks blocks, one or more of the blocks of data having a confidential code added thereto;
   means for communicating to a user, in response to a request, the data received by said data receiving means; and
   inhibiting means for testing each of the blocks of data to determine whether or not the confidential code has been added to each block, respectively, and for inhibiting said means for communicating to a user, in the absence of a further code corresponding to the confidential code, the data in any of the blocks to which the confidential code has been added,
   wherein the communicating to the user of data received by said data receiving means is performed in response to the request only for blocks of the data to which the confidential code has not been added and the communicating to the user of the received data is thus partially inhibited by said inhibiting means.

5. An apparatus according to claim 4, further comprising means for inputting an instruction for performing communication to the user of each block of the data inhibited by said inhibiting means and means for enabling said communication means to communicate to the user each block of data inhibited by said inhibiting means in response to the instruction.

6. An apparatus according to claim 5, wherein each block of the data to which the confidential code has been added is communicated to the user upon input of the instruction corresponding to the confidential code by said instruction input means.

7. An apparatus according to claim 4, wherein said communication means displays the received data.

8. An apparatus according to claim 4, wherein said communication means records the received data.

9. A data communication system comprising:
   a data transmitter apparatus comprising:
   data transmission means for dividing at least one page of data into blocks in accordance with the kinds of data and transmitting the blocks of data to a data receiver apparatus; and
   means for adding a confidential code into one or more of the blocks of data; and
   said data receiver apparatus comprising:
   data receiving means for receiving said blocks of data transmitted by said data transmission means;
   means for communicating to the user, in response to a request, the data received by said data receiving means; and
   inhibiting means for testing the received blocks of data, to determine whether or not the confidential code is added to each of the received blocks of data, respectively, and inhibiting said communicating means from communicating to the user, in the absence of a further code corresponding to the confidential code, the data in any of the blocks to which the confidential code is added,
   wherein each block of data includes identification data indicating its kind, and said communication means communicates to the user the blocks of data in accordance with the identification data,
   wherein the communicating to the user of the data received by said data receiving means is performed in response to the request only for blocks of data to which the confidential code has not been added and the communicating to the user of the received data thus is partially inhibited by said inhibiting means.

10. A system according to claim 9, wherein the data is divided into one or more blocks consisting of character code data and one or more blocks consisting of image data.

11. A system according to claim 9, wherein each of the blocks is provided with an identification code indicating whether the block consists of character code data or of image data.

12. A system according to claim 9, wherein said communication means displays the received data.

13. A system according to claim 9, wherein said communication means records the received data.

14. A system according to claim 9, wherein said data receiver apparatus further comprises means for inputting an instruction for performing communication to the user of each block of the data inhibited by said inhibiting means and means for enabling said communication means to communicate to the user each block of the data inhibited by said inhibiting means in response to the instruction.

15. A system according to claim 14, wherein each block of the data to which the confidential code has been added is rendered visible upon input of the instruction corresponding to the confidential code by said instruction input means.

* * * * *

UNITED STATES PATENT AND TRADEMARK OFFICE
CERTIFICATE OF CORRECTION

PATENT NO. : 5,258,998
DATED : November 2, 1993
INVENTOR(S) : YUMI KOIDE

It is certified that error appears in the above-identified patent and that said Letters Patent is hereby corrected as shown below:

ON TITLE PAGE

In [56] References Cited, under U.S. PATENT DOCUMENTS,
   insert: --4,819,063  4/1989  Sugiura et al. ... 358/442
           4,827,349  5/1989  Ogata et al. ..... 358/434--.

COLUMN 4

Line 5, "(S51)" should read --(S52)--.
Line 16, "mourse 62." should read --mouse 62.--.

Signed and Sealed this

Thirtieth Day of August, 1994

Attest:

BRUCE LEHMAN

Attesting Officer            Commissioner of Patents and Trademarks